United States Patent
Artusi

(10) Patent No.: US 11,906,815 B2
(45) Date of Patent: Feb. 20, 2024

(54) MOUNT FOR SPECTACLES

(71) Applicant: SAFILO SOCIETÀ AZIONARIA FABBRICA ITALIANA LAVORAZIONE OCCHIALI S.P.A., Padua (IT)

(72) Inventor: Ampelio Artusi, Padua (IT)

( * ) Notice: Subject to any disclaimer, the term of this patent is extended or adjusted under 35 U.S.C. 154(b) by 638 days.

(21) Appl. No.: 16/973,656

(22) PCT Filed: Jun. 12, 2019

(86) PCT No.: PCT/EP2019/065292
§ 371 (c)(1),
(2) Date: Dec. 9, 2020

(87) PCT Pub. No.: WO2019/238726
PCT Pub. Date: Dec. 19, 2019

(65) Prior Publication Data
US 2021/0255478 A1   Aug. 19, 2021

(30) Foreign Application Priority Data

Jun. 15, 2018   (IT) .................. 102018000006382

(51) Int. Cl.
*G02C 1/08* (2006.01)
(52) U.S. Cl.
CPC ........... *G02C 1/08* (2013.01); *G02C 2200/06* (2013.01); *G02C 2200/10* (2013.01)

(58) Field of Classification Search
CPC ... G02C 1/08; G02C 2200/06; G02C 2200/10
USPC ..................................... 351/90–102
See application file for complete search history.

(56) References Cited

U.S. PATENT DOCUMENTS 5,914,768 A   6/1999  Hyoi

FOREIGN PATENT DOCUMENTS

| EP | 1729165 A1 | 12/2006 |
|---|---|---|
| FR | 2487084 A1 | 1/1982 |
| KR | 20140127568 A | 11/2014 |

*Primary Examiner* — Mahidere S Sahle
(74) *Attorney, Agent, or Firm* — Volpe Koenig

(57) ABSTRACT

A mount for spectacles includes a front frame having a pair of structures for holding lenses, which are connected by a central bridge extending in a nasal support zone, each lens-holding structure has an upper element for holding the lens, surrounding a part of the lens profile at the top, between the central bridge and a corresponding opposite lateral tenon intended to be connected to a lateral arm so as to articulate about an axis of articulation. The upper element is integral to the bridge and to the corresponding lateral tenon, and a lower element for supporting the lens, which extends so as to surround the remaining part of the lens profile at the bottom between the bridge and the corresponding lateral tenon, the lower element having a first end connected to the front frame at the central bridge and a second, opposite end constrained to the lateral tenon.

8 Claims, 7 Drawing Sheets

MOUNT FOR SPECTACLES

TECHNICAL FIELD

The present invention relates to a mount for spectacles that has the features set out in the preamble of the main claim 1.

TECHNOLOGICAL BACKGROUND

In this field, a traditional system for closing the lens-holding rim (also referred to as an "eyepiece holder"), which system is intended to ensure that the lens is held stably on the rim and to simultaneously allow the eyepiece holder to be opened in order to insert or remove said lens, includes what is referred to as the classic threaded "tube" structure. In practice, the rim is designed so as to have an open profile and carries, at the break, a pair of tube-shaped formations which are each integral with a corresponding end of the rim, and having respective coaxial holes, one of which is threaded in order to engage a screw which can constrain the tubes to one another, thereby locking the lens in the rim. Loosening the screw, thereby allowing the tubes to be mutually separated, allows the rim to be opened to a limited extent in order to allow the lens to be removed from or inserted into the rim, prior to the screw being tightened.

This type of solution, in the multiple versions thereof that are available in the prior art, traditionally has several disadvantages, including the possible undesired loosening of the screw. The problem of the screw self-unscrewing is in fact the main problem which the traditional system for closing the rim by means of a "tube" faces.

In fact, spectacles are involuntarily subjected to a high number of vibrations (for example, during transport inside bags or cases, or while the user is walking, or even while the user is moving by means of automotive vehicles, boats, etc.).

The effect of vibrations of this kind can easily translate into self-unscrewing, i.e. into loosening of the tightening force and tightening depth of the screw, leading to the possible undesired release of the screw from the tube.

If this is not noticed and then corrected in good time, self-unscrewing can be a serious disadvantage, given that the eyepiece holder opening as a result of the screw loosening then leads to the risk that the lens comes out of the front frame and can break while falling to the ground, therefore becoming unusable.

The system of locking and closing the lens by means of a "tube" generally includes orienting the screw along a vertical axis (taking into consideration the spectacles worn) and, in the vast majority of cases, inserting said screw from below. The choice of inserting the screw from below responds to the need or the opportunity to hide the head of the screw such that it cannot affect the design of the mount.

However, precisely because the screw is inserted in a position hidden from view, it is not possible for the user to notice in good time the start of potential self-unscrewing, with the risk of being able to notice the problem only after the lens has come out.

Secondly, again as a result of the secluded and hidden position of the screw, it is generally not very easy to screw or unscrew the screw.

DESCRIPTION OF THE INVENTION

The main aim of the present invention is that of providing a mount for spectacles which is structurally and functionally designed to overcome the proven disadvantages of the known solutions, and in particular which allows the aforementioned problem of self-unscrewing to be prevented or controlled more effectively.

This aim and other aims which will become apparent in the following are achieved by a mount for spectacles produced in accordance with the accompanying claims.

BRIEF DESCRIPTION OF THE DRAWINGS

Further features and advantages of the invention will become clearer from the following detailed description of embodiments thereof, shown by way of non-restrictive example and with reference to the accompanying drawings, in which.

PREFERRED EMBODIMENTS OF THE INVENTION

Figure 1:
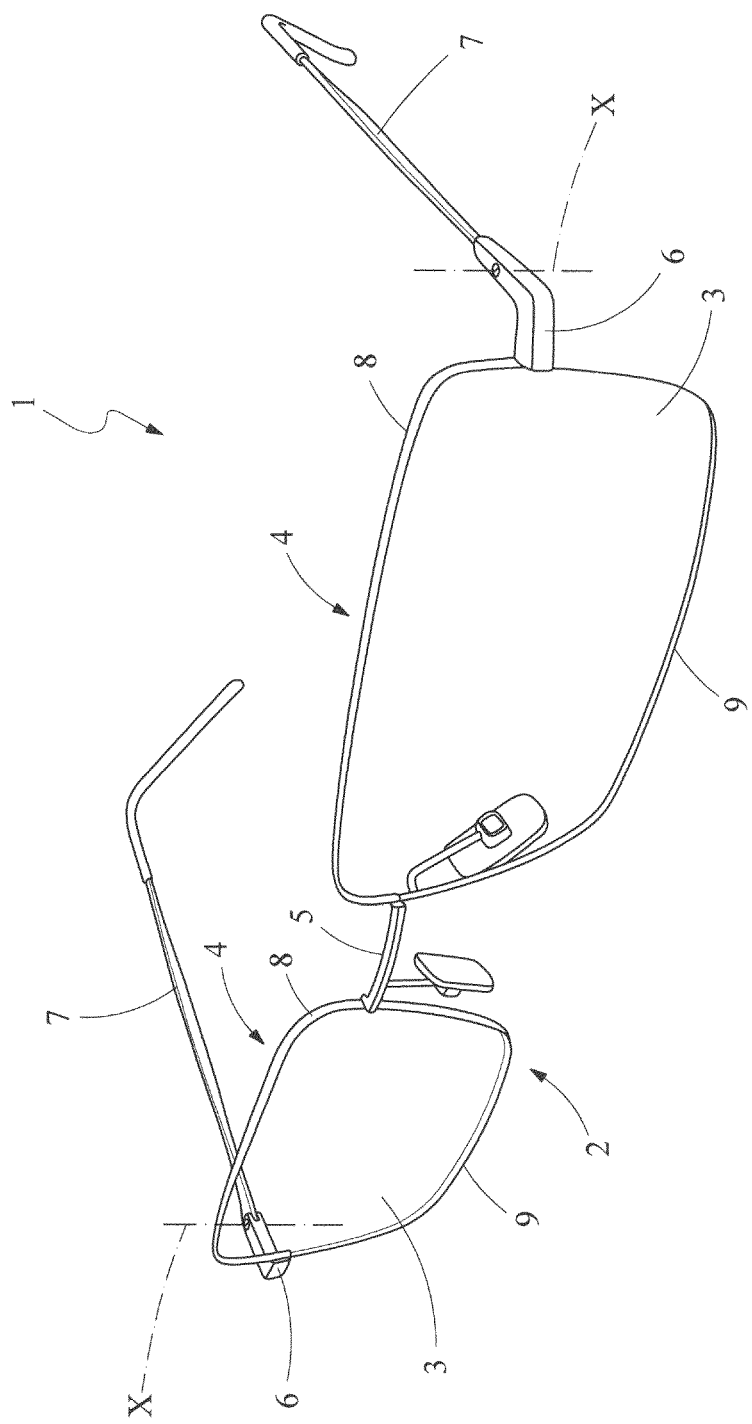
FIG. 1 is a perspective view of a mount for spectacles produced in accordance with a first example of the present invention.

With reference to the figures cited, the reference numeral 1 indicates as a whole a mount for spectacles, produced in accordance with a first example of the present invention, comprising a front frame 2 for holding lenses 3, provided with a pair of lens-holding structures 4 connected by a central bridge 5 extending in a nasal support zone.

Each lens-holding structure 4 is designed to provide, in each lens 3, the perimeter profile for holding the lens on the front frame. In this example, the mount is produced by means of what is referred to as a "half frame", of the type comprising upper arches, preferably made of metal, which extend along the brow arches which are connected to the central bridge 5 and to respective lateral tenons 6 provided for articulately connecting respective arms 7 to the front frame. Each upper arch structure is then completed by a lower support made of wire, preferably metal wire, that has a predetermined resilience and is substantially rigid in the example described here.

On account of structural and operational analogy, a single lens-holding structure 4 of the mount will be described in detail in the following. It is understood that similar design details of each lens-holding structure, although having a mirrored shape, are marked by the same reference numerals for ease of presentation.

Each lens-holding structure 4 comprises an upper element 8 for holding the lens 3, designed so as to surround at least a part of the lens profile at the top, in a brow arch zone (identifiable by considering the spectacles worn on the head), between the central bridge 5 and the corresponding opposite lateral tenon 6 intended to be connected to the lateral arm 7 so as to articulate about an axis of articulation, which is indicated by X. The upper element 8, which is preferably metal, therefore provides the structure of the upper arch referred to above as a front "half frame" and is integral with the bridge 5 and with the corresponding lateral tenon 6, for example by means of welding.

Each lens-holding structure 4 also comprises a lower element 9 for supporting the lens 3, which element extends so as to surround the remaining part of the lens profile at the bottom between the bridge 5 and the corresponding lateral tenon 6, said lower element having a first end 9a connected to the front frame 2 at the central bridge 5 and a second, opposite end 9b intended to be constrained to the lateral tenon 6.

Figure 2A:
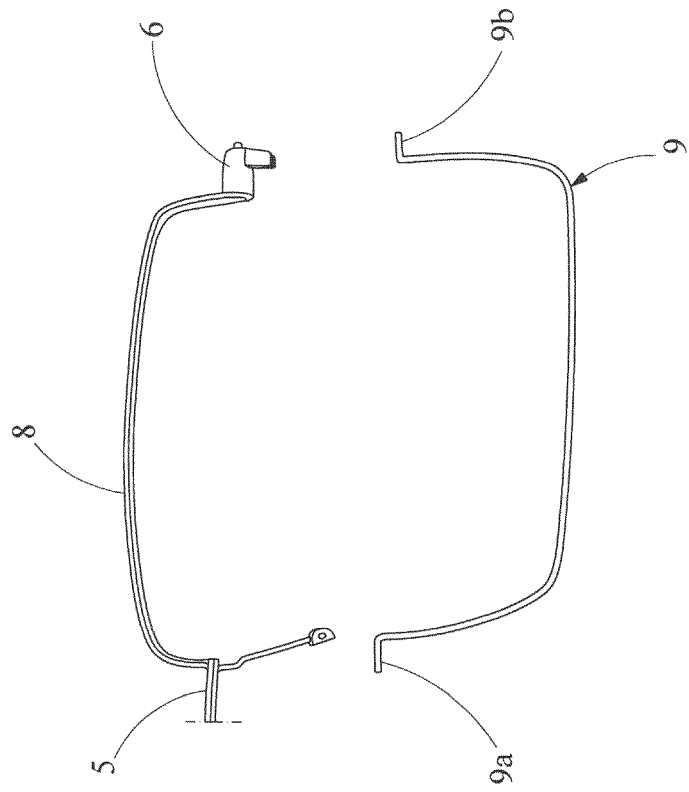
FIG. 2A is a partial perspective view, with parts detached, of the mount in the preceding figures.
Figure 2:
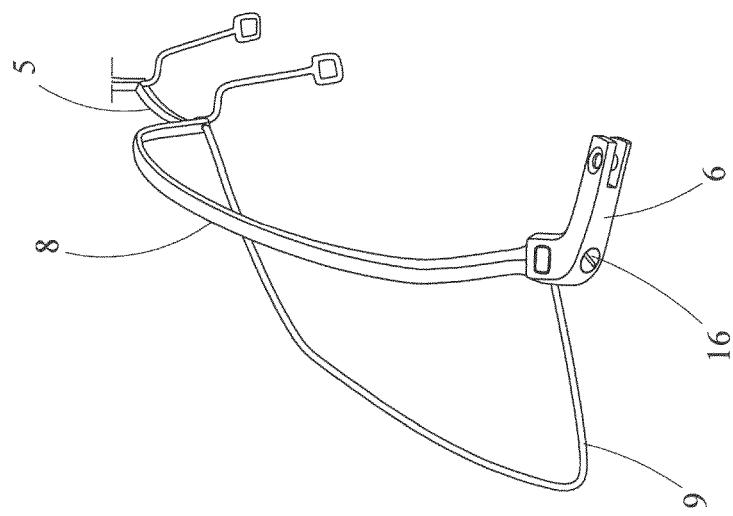
FIGS. 2 and 3 are partial perspective views of details of the mount in FIG. 1.
Figure 4:
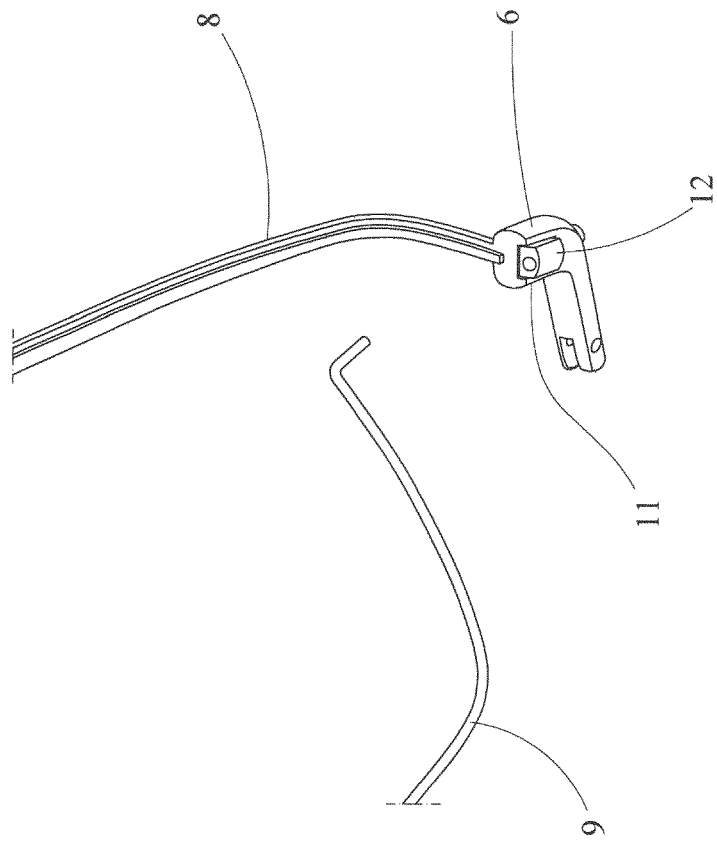
FIG. 4 is a view corresponding to that in FIG. 3, in a non-assembled state of the detail shown.
Figure 3:
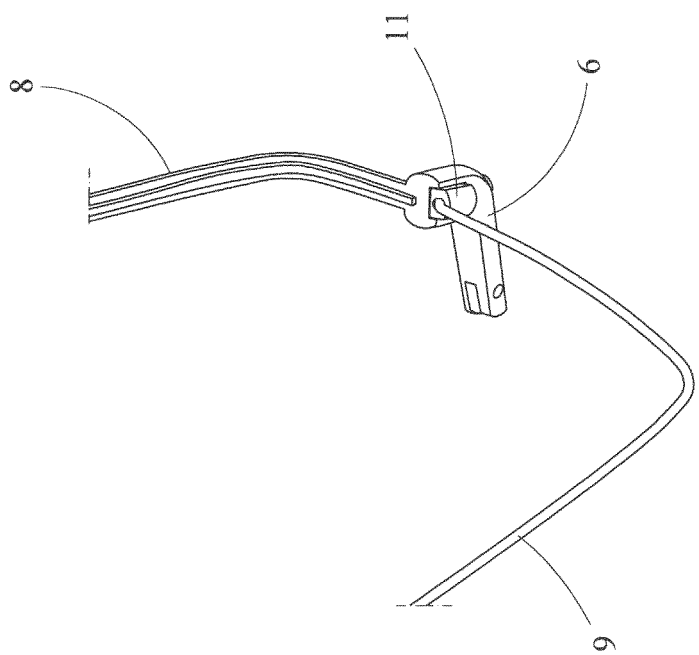

The lower element 9 is structurally independent of the front frame 2 and is advantageously made of a wire having a predefined resilience and preferably of a metal wire that is substantially rigid, the terminal parts of which are folded substantially at right angles at the ends 9a, 9b, as shown clearly in FIG. 2A.

The reference numeral 10 indicates a respective seat provided in each of the opposing sides of the bridge 5, in the connection zone of the bridge to the corresponding upper element 8, which seat is produced for example as a cylindrical cavity that extends transversely to the vertical direction, the vertical direction meaning that which is substantially parallel to the direction of the axis of articulation X.

Figure 5:
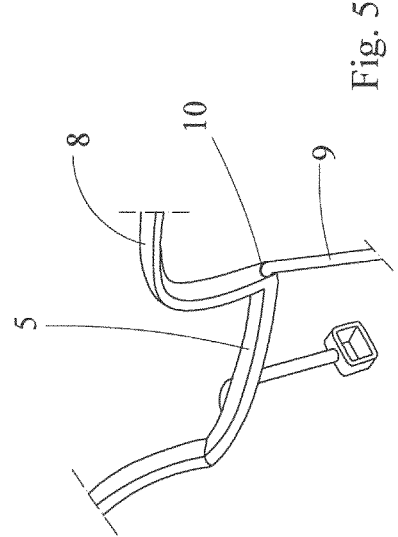
FIG. 5 is a further partial enlarged perspective view of a detail of the mount in the preceding figures.
Figure 6:
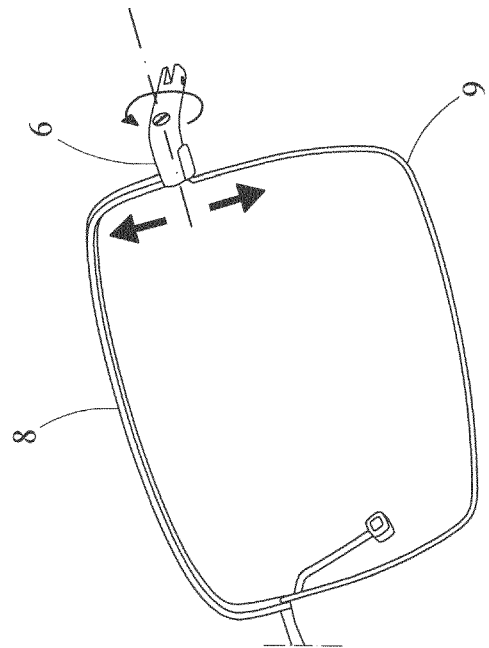
FIGS. 6 and 7 are partial perspective views of the same detail in the preceding figures, in which views the operation is shown schematically.
Figure 7:
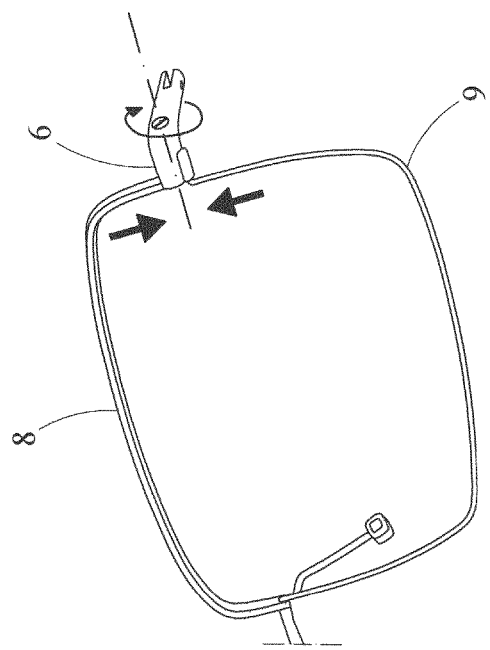
Figure 9:
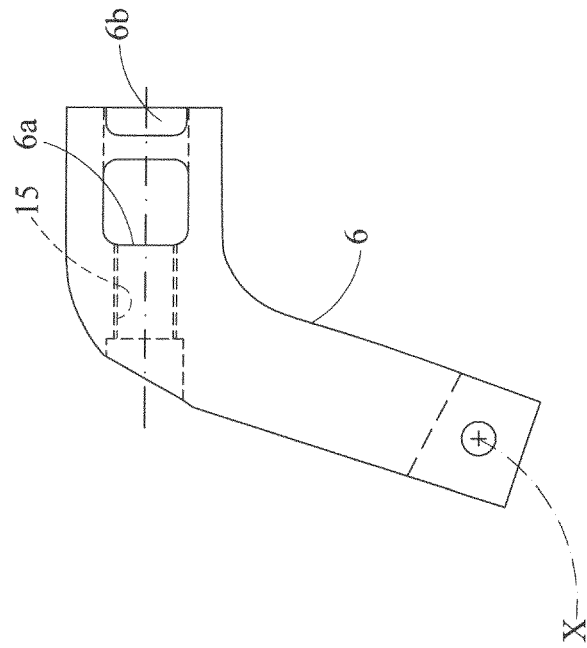
FIG. 9 is a plan view from above of the detail in FIG. 8.
Figure 8:
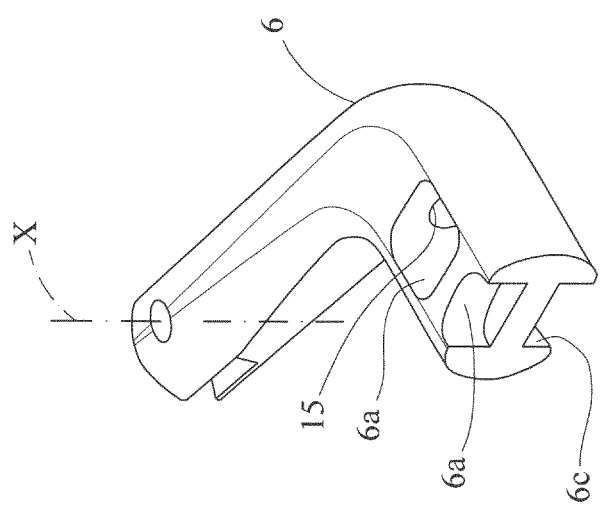
FIG. 8 is an enlarged perspective view of a detail of the mount in the preceding figures.
Figure 12:
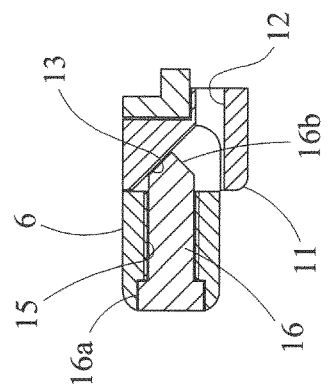
FIG. 12 is a partial sectional view of the details in FIGS. 8 and 11, shown in an assembled state.

Each seat 10 is designed to receive in coupling engagement the end 9a of the element 9, so as to constrain said lower element to the front frame, at the bridge, as shown in FIG. 5.

In order to close the lens-holding structure 4 around the profile of the corresponding lens 3, the lower support element 9 is connected to the corresponding lateral tenon 6, as described in greater detail in the following.

The mount 1 comprises a corresponding box-shaped body 11 received in each tenon 6 and guided in a through-cavity 6a of the tenon so as to slide to a limited extent in the vertical direction that is substantially parallel to the direction of the axis of articulation.

A seat 12 is provided in the box-shaped body, which seat is for example in the form of a cylindrical cavity and extends transversely to the vertical sliding direction of the body, and in which seat the folded portion of the end 9b of the lower support element 9 is intended to be removably received.

Figure 11:
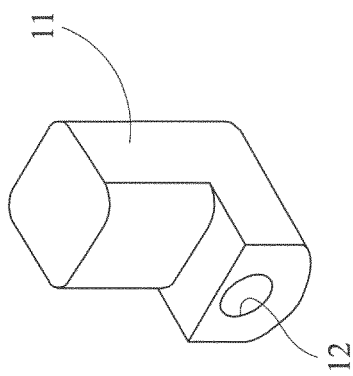
FIG. 11 is a perspective view of the detail in FIG. 10.
Figure 10:
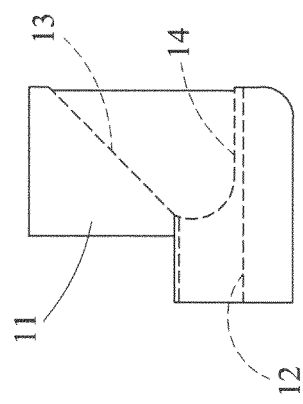
FIG. 10 is a side elevation of a further detail in the preceding figures.

With reference to FIG. 11, the seat 12 is preferably made in a portion of the body 11 and shaped at least in part as a sleeve integrally formed with the box-shaped body. Said portion, which partially projects from the main profile of the box-shaped body, can be received in a recess 6b made in the tenon in a position adjacent to the through-cavity 6a. The reference numeral 6c indicates a further recess provided in the tenon 6 in order to house and fasten, for example by means of welding, the corresponding end of the upper element 8.

By means of engaging in the seat 12, the end 9b is thus connected to the box-shaped body, and is intended to conjointly move with said body in the vertical sliding direction.

Moreover, a surface 13 that has a predetermined incline with respect to the vertical sliding direction is defined in the body 11, which surface is made in a recess 14 of the body that faces a threaded hole 15 which is made in the tenon and intended to engage a screw 16.

More particularly, the cavity defining the seat 12 is in communication with the recess 14, which in turn is in communication with the hole 15 engaged by the screw. The hole extends in the tenon transversely to the vertical direction and is open on the outer side of the tenon, from where it can be actuated so as to rotate the head 16a of the screw 16 by means of a suitable tool. On the side axially opposite to the head, the shank of the screw 16 has an end 16b having a conical profile shape, the generatrixes of which can couple to the inclined surface 13 by means of surface contact.

The coupling is selected such that the screw 16 acts against the surface 13, in order to transform a translational movement of the screw, obtained by the screw-female screw coupling by means of rotating said screw, into a translational movement of the body 11 in the vertical sliding direction, and to consequently move the lower support element 9 towards or away from the upper support element 8, in order to generate or remove, respectively, the locking of the lens on the frame between the upper element and lower element.

Figure 14:
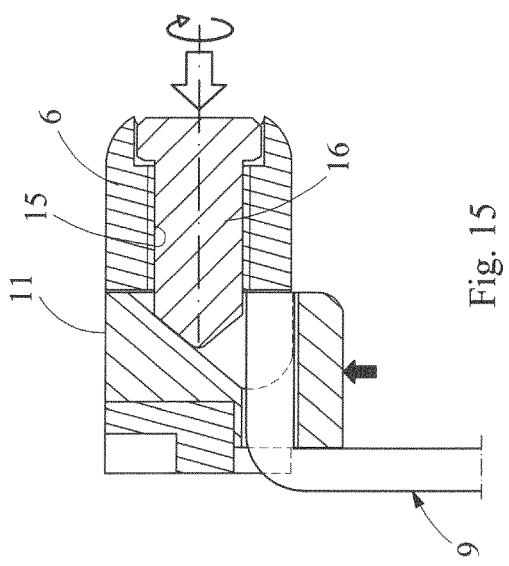
FIG. 13 to 15 are sectional enlarged views corresponding to that in FIG. 12, in a sequence of positions relative to a first operational state.
Figure 13:
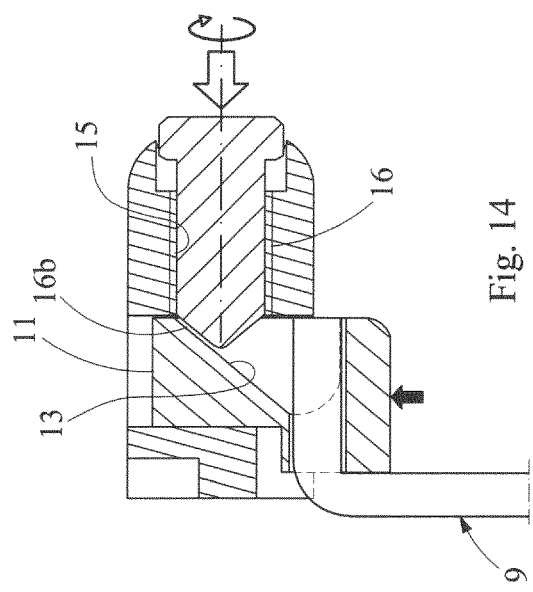
Figure 15:
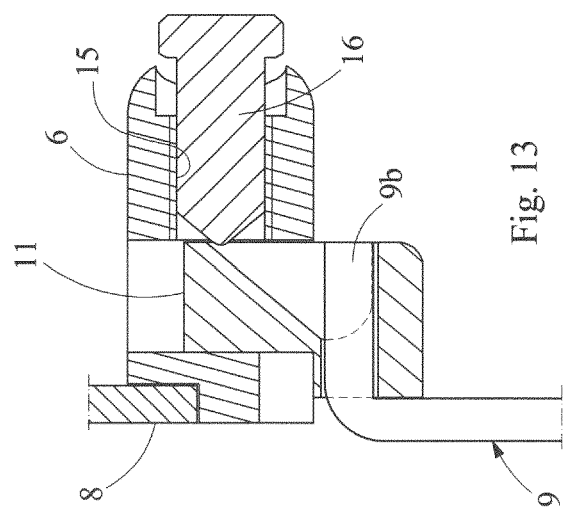

The operation for closing the lens-holding structure around the lens profile is shown in the sequence of figures from FIG. 13 to 15, which closing is suitable for ensuring the action of holding the lens on the lens-holding structure.

FIG. 13 shows an initial state in which the elements 8 and 9 are mutually spaced apart on the tenon in order to create the maximum opening of the lens-holding structure that is suitable for allowing the lens to be inserted into the structure.

In this position, the screw 16 is engaged in the hole 15 without the conical profile 16b engaging the inclined surface 13.

By means of rotating the screw 16 so as to screw into the threaded hole 15, the conical profile of the end 16b is brought into engagement with the inclined surface 13 by means of sliding contact, thereby causing the vertical sliding of the body 11, as clearly shown in FIGS. 14 and 15. During the vertical translation of the body 11, the lower support element 9b, moving conjointly therewith (FIG. 14), is brought towards the end of the upper element 8 and faces said end, thereby determining the closure of the lens-holding structure around the lens profile (FIG. 15). The degree of closure can be controlled by means of tightening the screw in the threaded hole to a greater or lesser extent.

Figure 17:
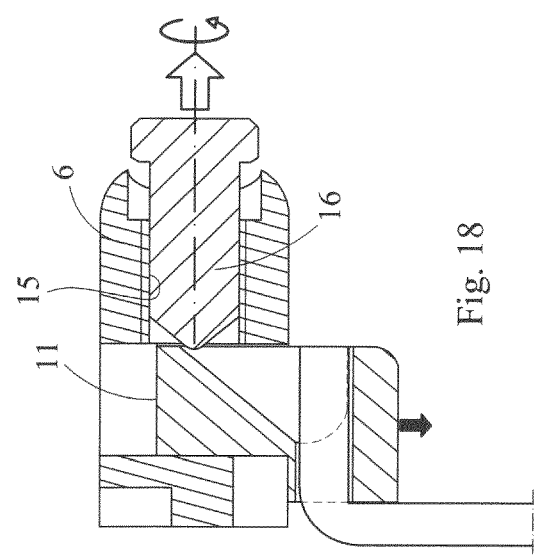
FIG. 16 to 18 are sectional enlarged views corresponding to those in FIG. 13 to 15, in a distinct sequence of positions relative to a second operational state.
Figure 16:
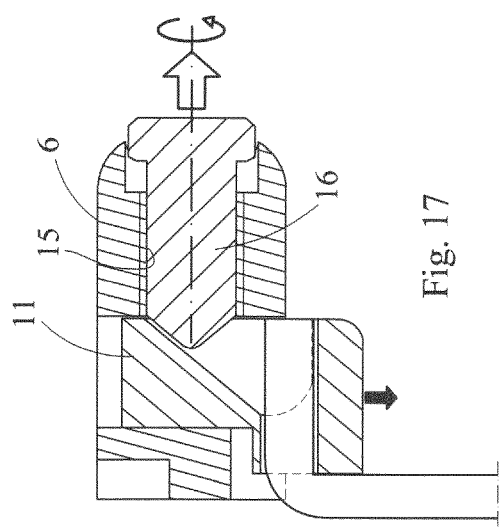
Figure 18:
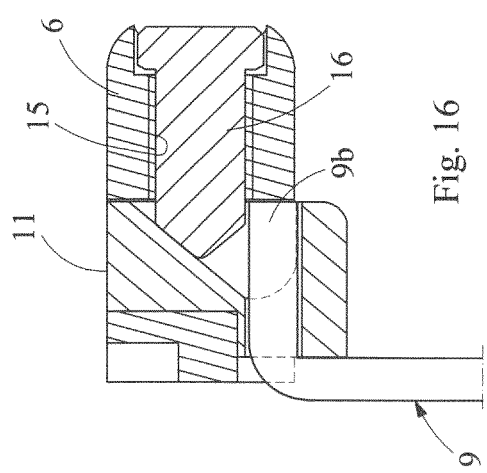

Starting from a closed state of the lens-holding structure, shown in FIG. 15, an inverse movement is carried out in order to remove the lens, which movement is obtained by unscrewing the screw from the hole (FIG. 17), and consequently disengaging the inclined surface 13 and the conical end of the screw. This disengagement allows freedom of movement of the lower support element 9 away from the upper element 8. The maximum degree of opening, reached in the position in FIG. 18, thereby allows the lens to be removed from the corresponding lens-holding structure.

In a variant embodiment, the lower support element 9 can be made as a single piece with the frame 2 at the end 9a. In this design, the perimeter profile of the lens-holding structure is therefore broken only at the end 9b of the lower element 9, with respect to the lateral tenon. In order to facilitate the opening movement of the lens-holding structure, this structure can also be produced so as to have greater flexibility localised in the connection zone to the bridge, at the connection between the lower and upper element.

In a further variant, the lower support element can be shaped, in cross section, so as to be identical to the upper element, instead of having a wire shape (in particular a circular cross section) of the type described above.

It is noted that, in the mount according to the present invention, the position of the screw (arranged transversely with respect to the vertical direction and laterally accessible) allows the screwing depth to be easily controlled, and therefore allows the start of possible self-unscrewing to be noticed in good time, i.e. before the screw and lens come out. Furthermore, both while installing/dismantling the lens and while simply controlling the screwing depth, acting on the screw is easy due to the easily accessible position.

Moreover, with respect to the known solutions which use "tube" closure systems in which the screw is inserted from above instead of from below, the new system has a greater aesthetic "neatness" or "linearity" due to the lateral position of the screw.

A further advantage over the typical applications of the "tube" system or similar solutions in the prior art is that, by means of the mount according to the invention, a welding phase or, more precisely, a welding phase between a "lower semi-tube" and the corresponding arch or metal "rim" can be eliminated. The elimination of a welding phase simplifies the production process, and therefore lowers costs as well as eliminating minor potential causes of defects.

The invention thereby achieves the proposed aims while providing numerous advantages with respect to the prior art.

The invention claimed is:

1. Mount for spectacles comprising a front frame (2) having a pair of structures (4) for holding lenses (3), said pair of structures are connected by a central bridge (5) extending in a nasal support zone, each structure of said pair of structures (4) comprising:
    an upper element (8) for holding the lens (3), configured so as to surround at least a part of a lens profile at a top portion, in a brow arch zone, between the central bridge (5) and a corresponding opposite lateral tenon (6) connectable to a lateral arm (7) so as to articulate about an axis of articulation (X), said upper element (8) being integral with the bridge (5) and the corresponding lateral tenon (6),
    a lower element (9) for supporting the lens (3), said element extends so as to surround the remaining part of the lens profile at a bottom portion between the bridge (5) and the corresponding lateral tenon (6), said lower element (9) having a first end (9a) connected to the front frame (2) at the central bridge (5) and a second, opposite end (9b) configured to be constrained to the lateral tenon (6),
    a corresponding box-shaped body (11) received in each tenon (6) and guided so as to slide to a limited extent in a vertical direction that is substantially parallel to the direction of the axis of articulation, said second end (9b) of the lower support element (9) being constrained to said box-shaped body (11), and
    a surface (13) having a predetermined incline with respect to the vertical sliding direction defined on said body (11), against said surface a screw (16) is active which is screwed in a hole (15) provided in the tenon (6) and directed transversely to the vertical sliding direction, so as to transform a translational movement of the screw (16) with respect to the tenon (6), said movement is created by the screwing or unscrewing of said screw, into a translational movement of said body (11) in the sliding direction, and to subsequently move the lower support element (9) towards or away from the upper support element (8), in order to generate or remove, respectively, a locking of the lens (3) on the frame (2) between said upper element (8) and lower element (9).

2. The mount for spectacles according to claim 1, wherein said second end (9b) of the lower support element (9) is removably received in a seat (12) that extends in the box-shaped body (11) transversely to the vertical sliding direction of said body.

3. The mount for spectacles according to claim 2, wherein said lower support element (9) is formed having a metal wire structure that is substantially rigid.

4. The mount for spectacles according to claim 3, wherein the lower support element (9) made of wire is structurally independent of the front frame (2), the first end and the second opposite end (9a, 9b) of the wire being folded substantially at right angles, a corresponding seat (10) being provided in the bridge (5), said seat can removably receive the first end (9a) of said lower support element (9), each of said first and second ends (9a, 9b) engaging the corresponding seat in a transverse direction with respect to said vertical direction.

5. The mount according to claim 1, wherein said body (11) is slidably guided in a through-cavity (6a) of the tenon (6), said cavity is in communication with the threaded hole (15) in which said screw (16) engages.

6. The mount according to claim 1, wherein said inclined surface (13) is made in a recess (14) of said body (11) that faces the threaded hole (15) in which said screw (16) engages, said screw having, on the end (16b) thereof that is axially opposite to a head (16a), a conical profile shape, generatrixes of which can couple to said inclined surface (13) by of surface contact.

7. The mount according to claim 2, wherein said lower support element (9) is made as a single piece with the frame (2) at said first end (9a).

8. The mount according to claim 3, wherein said lower support element (9) is made as a single piece with the frame (2) at said first end (9a).

* * * * *